(12) United States Patent
De Leo et al.

(10) Patent No.: US 9,053,416 B1
(45) Date of Patent: Jun. 9, 2015

(54) SYSTEMS AND METHODS FOR SCREENING POTENTIALLY INAPPROPRIATE CONTENT

(75) Inventors: Carter De Leo, Goleta, CA (US); Brian Truong, San Bruno, CA (US); Weijian Cheng, San Francisco, CA (US); Anthony Yuliang Wu, San Francisco, CA (US); Patrick Hung, San Bruno, CA (US)

(73) Assignee: Google Inc., Mountain View, CA (US)

( * ) Notice: Subject to any disclaimer, the term of this patent is extended or adjusted under 35 U.S.C. 154(b) by 637 days.

(21) Appl. No.: 13/342,835

(22) Filed: Jan. 3, 2012

(51) Int. Cl.
*G06F 15/18* (2006.01)
*G06N 5/02* (2006.01)
*G06N 7/00* (2006.01)
*H04L 29/08* (2006.01)
*G06N 99/00* (2010.01)

(52) U.S. Cl.
CPC .............. *G06N 7/005* (2013.01); *G06N 99/005* (2013.01); *H04L 67/1057* (2013.01)

(58) Field of Classification Search
CPC ..... G06N 3/126; G06N 7/005; G06N 99/005; H04L 67/1057
USPC ................................ 706/12, 13, 46; 715/200
See application file for complete search history.

(56) References Cited

U.S. PATENT DOCUMENTS

| | | | |
|---|---|---|---|
| 7,107,254 B1 * | 9/2006 | Dumais et al. ................ | 706/12 |
| 8,132,250 B2 * | 3/2012 | Judge et al. ...................... | 726/13 |
| 8,645,295 B1 * | 2/2014 | Dillard ............................ | 706/20 |
| 2009/0088726 A1 * | 4/2009 | Horvitz et al. ................ | 604/522 |
| 2009/0132689 A1 * | 5/2009 | Zaltzman et al. ............. | 709/223 |
| 2010/0011071 A1 * | 1/2010 | Zheleva ........................ | 709/206 |
| 2010/0115040 A1 * | 5/2010 | Sargent et al. ................ | 709/206 |
| 2010/0287368 A1 * | 11/2010 | Shuster et al. ................ | 713/150 |
| 2013/0073632 A1 * | 3/2013 | Fedorov et al. ............... | 709/205 |

OTHER PUBLICATIONS

Wang "A new fuzzy adaptive multi-population genetic algorithm based spam filtering method." 2nd International Conference on Information Engineering and Computer Science (ICIECS), 2010. IEEE, Dec. 25-26, 2010. 4 pags. DOI: 10.1109/ICIECS.2010.5678249.*
Sirivianos, M. et al. "Social Filter: introducing social trust to collaborative spam mitigation." INFOCOM, 2011 Proceedings IEEE. pp. 2300-2308. IEEE, Apr. 10-15, 2011. DOI: 10.1109/INFCOM.2011.5935047.*

(Continued)

*Primary Examiner* — David Vincent
*Assistant Examiner* — Benjamin Buss
(74) *Attorney, Agent, or Firm* — Amin, Turocy & Watson, LLP

(57) ABSTRACT

This disclosure relates to screening potentially inappropriate online content. A flag is received that indicates online content is potentially inappropriate. The flag is generated by a source, such as a user, or a content classifier. The potential accuracy of the flag is determined or inferred based on a variety of factors, including a reputation of the source, and the flag is categorized as requiring higher priority administrative action or requiring lower priority administrative action based in part on the potential accuracy of the flag. In addition, administrative action is taken based in part on the categorization of the flag.

14 Claims, 10 Drawing Sheets

(56) References Cited

OTHER PUBLICATIONS

Hameed, S. et al. "LENS: Leveraging Social Networking and Trust to Prevent Spam Transmission." 19th IEEE International Conference on Network Protocols (ICNP), 2011. pp. 13-18. IEEE, Oct. 17-20, 2011. DOI: 10.1109/ICNP.2011.6089044.*

M. Sandler et al., "Monitoring Algorithms for Negative Feedback Systems," in Proceedings of the 19th International Conference on World Wide Web, 2010, pp. 871-880.

P. Felzenszwalb et al., "Efficient Belief Propagation for Early Vision," International Journal of Computer Vision, 2006, pp. 41-54, vol. 70, No. 1.

F. Fleuret, "Fast Binary Feature Selection with Conditional Mutual Information," Journal of Machine Learning Research, 2004, pp. 1531-1555, vol. 5.

L. Eshelman, "The CHC Adaptive Search Algorithm: How to Have Safe Search When Engaging in Nontraditional Genetic Recombination," Foundations of Genetic Algorithms, 1991, pp. 256-283, Morgan Kaufmann Publishers, San Mateo, California.

S. Maji et al., "Classification using Intersection Kernel Support Vector Machines is Efficient," CVPR, 2008, 8 pages.

K. Crammer et al., "Online Passive-Aggressive Algorithms," Journal of Machine Learning Research, 2006, pp. 551-585, vol. 7.

\* cited by examiner

SYSTEMS AND METHODS FOR SCREENING POTENTIALLY INAPPROPRIATE CONTENT

TECHNICAL FIELD

This disclosure generally relates to systems and methods that facilitate screening potentially inappropriate online content.

BACKGROUND

Computing technology and the Internet have fundamentally changed the processes of creating and disseminating information and media. Hundreds of millions of people around the world have the capability to create and share content, including videos, music, and blogs. A large number of online services exist to host the ever-growing volume of user-generated content. Popular online services can receive tens of hours worth of newly uploaded content every minute.

In addition to issues regarding handling such large quantities of content, growing along with this influx of data is a responsibility to monitor and take appropriate action related to content that may violate the service's Terms of Use, interfere with intellectual property rights, or violate laws of various jurisdictions around the world. Internet services hosting and distributing user-generated content require mechanisms to ensure that the content is appropriate.

The pace of content creation and sharing would overwhelm efforts by even a modestly-sized service to comprehensively review all submissions, so alternate approaches have to be adopted. A technique that has been employed is to leverage the size of a service's community by enabling users to draw attention to potentially inappropriate content through review or flagging systems. This allows the service to assign attention to a submission based on its level of exposure and/or perceived severity of the potential violation.

However, reliance on the judgment of untrained users can create additional difficulties. Many reports may be mistaken, or may be a response to content that is unpopular but not inappropriate. In addition, malicious users may abuse flagging features to try to bring administrative action against content or a content creator they dislike or disagree with. For a service with a very large user population, this means that human review of even just the content that has been flagged by users may still be difficult.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

According to an aspect of the subject innovation, systems and methods for screening potentially inappropriate online content are disclosed. A hosting service includes a reception component that receives flag information (flag, report, warning, etc.) identifying online content as being potentially inappropriate. An analyzer component determines a potential accuracy of the flag information, and a categorization component categorizes the flag information based on the potential accuracy determined by the analyzer component. An administrative component takes an action based on the categorization of the flag information.

In one embodiment, a hosting service includes a reception component that receives a flag identifying online content as being potentially inappropriate. The flag is received from a user or a trained classifier. An analyzer component includes a classifier component that infers the potential accuracy of the flag information. The categorization component includes a utility component that performs a cost/benefit analysis of correctly categorizing the flag, and the categorization component categorizes the flag based in part on the inferred potential accuracy and the cost/benefit analysis. An administrative component takes action based on the categorization of the flag information.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
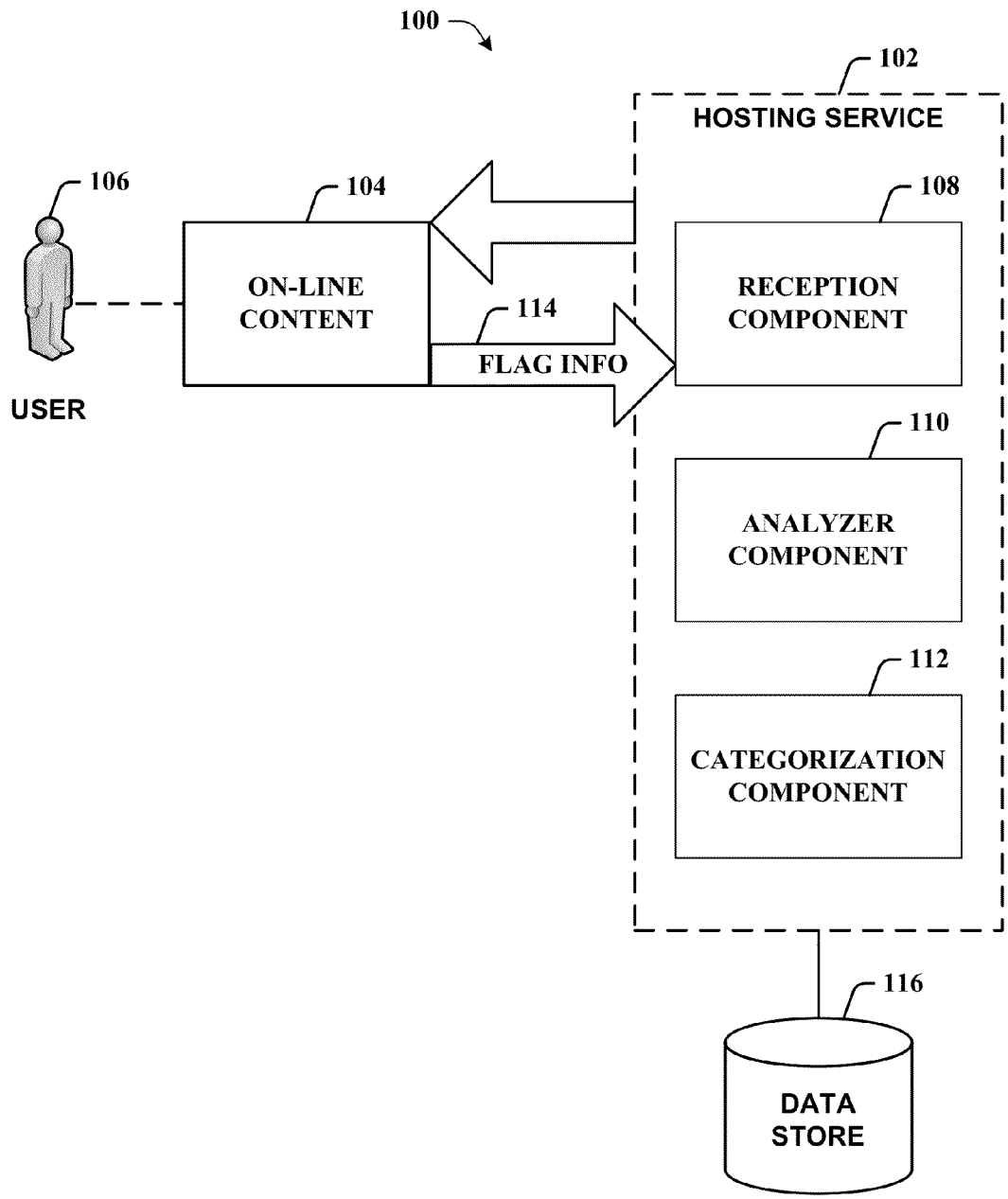
FIG. 1 illustrates an example system for screening potentially inappropriate online content in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It should be understood, however, that certain aspects of the disclosure can be practiced without these specific details. In other instances, well-known structures and devices are shown in block diagram form to facilitate describing the innovation.

Many internet services are provided via content hosting sites, e.g., websites, web portals, or web or mobile applications. Internet services hosting and distributing user-generated content (UGC) benefit from mechanisms that help ensure that the UGC is appropriate. However, the pace of content creation and sharing make comprehensive review of all UGC submissions impractical. As an alternative, hosting services often enable community users of the service to draw attention to possibly inappropriate content through review or flagging systems. However, the quantity and accuracy of flags generated by untrained members can create additional difficulties.

One non-limiting implementation of the innovation provides for screening of potentially inappropriate content that makes efficient use of a hosting service's resources. The implementation provides for efficient use of human review time and administrative action by employing a machine decision system to examine incoming flags, determine a level of potential accuracy of the flags, and submit potentially accurate flags for administrative action.

More particularly, in accordance with an embodiment, a reception component associated with a hosting system receives a flag, and an analyzer component determines or infers a potential accuracy of the flag. A categorization component categorizes the flag as having a certain priority level for administrative action based in part on the potential accuracy of the flag, and an administrative action component takes an action based on the categorization of the flag.

Non-Limiting Examples of Screening of Inappropriate Content

Turning now to FIG. 1, illustrated is an example system 100 for screening potentially inappropriate online content in accordance with various aspects described in this disclosure. Generally, system 100 can include a memory that stores computer executable components and a processor that executes computer executable components stored in the memory, examples of which can be found with reference to FIG. 10. System 100 includes a hosting service 102. The hosting service 102 publishes, streams, or otherwise provides online content 104 to users 106. The online content (content) 104 includes, but is not limited to, internet videos, music, blogs, games, and so forth. The content 104 can be official content that is generated, provided, licensed, etc. by the hosting service 102, or user-generated content (UGC) (e.g., user-generated videos, music, or blog) posted to the hosting service for sharing. As discussed, services hosting and distributing UGC benefit from mechanisms that help ensure that such content is appropriate. To these and related ends, the hosting service 102 includes a reception component 108, an analyzer component 110, and a categorization component 112.

The reception component 108 obtains, acquires, or otherwise receives flag information 114 associated with content 104. The flag information (e.g., flag, report, warning, etc.) 114 identifies, indicates, or otherwise designates the content 104 as potentially inappropriate. The content 104 may be inappropriate for a plurality of reasons, including, but not limited to, potentially violating a Term of Use for the hosting service 102, potentially infringing an intellectual property right, or potentially violating a law of a particular jurisdiction. For example, user 106 (e.g., a flagging user) can consume the content 104, determine explicit material included in the content 104 is in violation of a policy of the hosting service 102 regarding said material, and generate the flag information 114 to notify the hosting service 102 that the content 104 is potentially inappropriate. The flag information 114 can include virtually any information relating to a set of reasons why the content 104 is potentially inappropriate, including, but not limited to, a category of inappropriate content (e.g., spam, adult content, copyrighted material, etc.), a reason for generating the flag information 114, a marker (e.g., time, page, etc.) indicating occurrences of the potentially inappropriate material within the content 104, and so forth.

The analyzer component 110 examines, investigates, or otherwise inspects the flag information 114, and determines, produces, or otherwise generates a confidence score regarding a potential accuracy of the flag information 114. The analyzer component 110 generates the confidence score based on a plurality of factors, including but not limited to, in one implementation, a reputation of the flagging user 106 for generating reliable flag information, other flag information received for the content 104, viewership data for the content 104, and so forth. For example, the analyzer component 110 may determine that user 106 has a reputation for generating reliable flag information based on a previous number of times the user 106 has generated flag information that has been determined to have an accuracy level above a predetermined accuracy threshold. Based at least in part on the user's 106 reputation the analyzer component 110 generates a confidence score for the flag information 114.

The categorization component 112 classifies, labels, or otherwise categorizes the flag information 114 based in part on the confidence score generated by the analyzer component 110. For example, the categorization component 112 may categorize the flag information 114 as requiring administrative action within a certain short time frame (e.g., potentially highly accurate) if the confidence score is above a predetermined confidence threshold, or categorize the flag information 114 as requiring administrative action as it comes up for review in a standard queue (e.g., potentially inaccurate) if the confidence score is below the predetermined confidence threshold. The classification of the flag information 114 enables the hosting service 102 to effectively and efficiently manage large quantities of flag information that may be received. For example, the hosting service 102 can efficiently allocate resources by employing higher priority human review of content that has received flag information classified as requiring administrative action within a short time frame.

Figure 2:
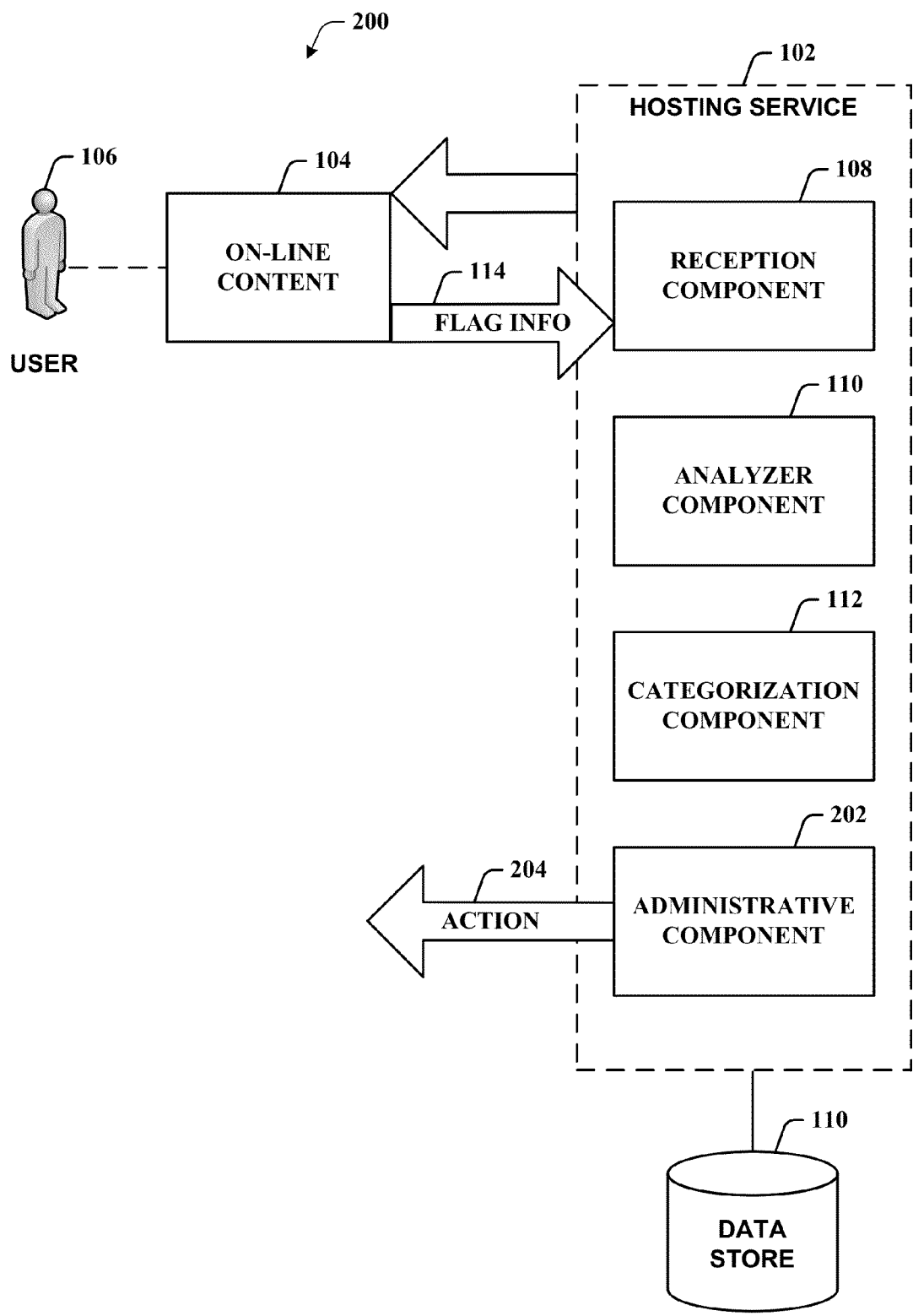
FIG. 2 illustrates an example system for screening potentially inappropriate online content in accordance with various aspects described in this disclosure.

FIG. 2 illustrates an example system 200 for screening potentially inappropriate online content in accordance with various aspects described in this disclosure. The system 200 includes a hosting service 102 that provides online content 104 to users 106. The hosting service 102 in FIG. 2 includes a reception component 108, an analyzer component 110, a categorization component 112, and an administrative component 202. The reception component 108 receives flag information 114 associated with content 104, the analyzer component 110 generates a confidence score regarding the potential accuracy of the flag information 114, and the categorization component 112 categorizes the flag information 114 based in part on the confidence score generated by the analyzer component 110.

The administrative component 202 executes, performs, or otherwise takes one or more actions 204 regarding the potentially inappropriate content 104 based in part on the categorization of the flag information 114 by the categorization component 112. The administrative component 202 takes certain predetermined actions 204 as appropriate for the hosting service 102 to exercise any required content control, examples of which are described further in connection with FIG. 5.

Figure 3:
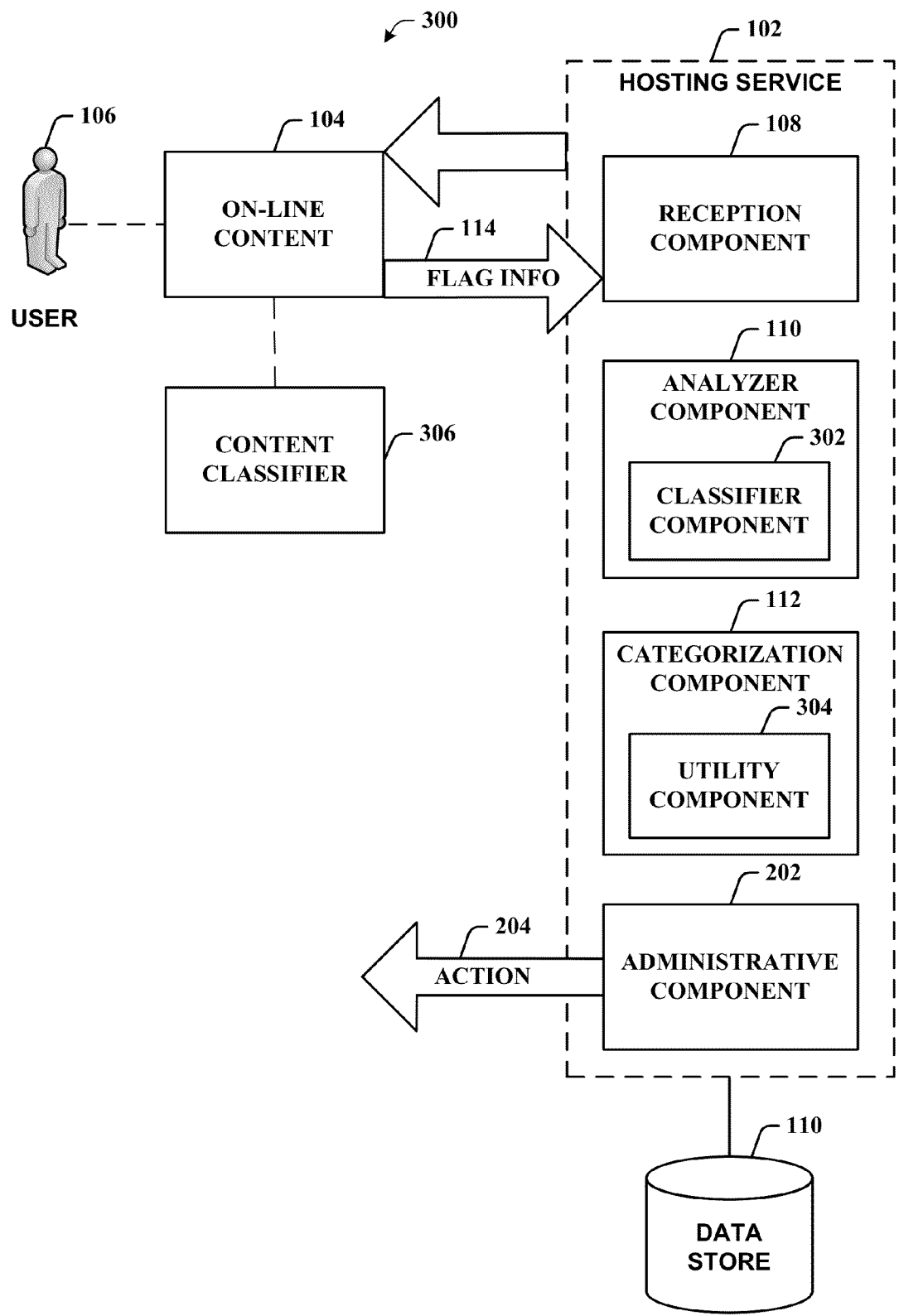
FIG. 3 illustrates an example system for screening potentially inappropriate online content in accordance with various aspects described in this disclosure.

Turning now to FIG. 3, illustrated is an example system 300 for screening potentially inappropriate online content in accordance with various aspects described in this disclosure. The system 300 includes a hosting service 102 that provides online content 104 to users 106. The hosting service 102 in FIG. 3 includes a reception component 108, an analyzer component 110, a categorization component 112, and an administrative component 202.

As discussed, the reception component 108 receives flag information 114 associated with content 104. The flag information 114 is received from a source, such as the user 106 that has consumed the content, or from a content classifier 306 that determines, scores, or otherwise examines the substance or material included in the content. For instance, the content 104 can be UGC, and uploaded to the hosting service 102 for online distribution. Within a predetermined time of initiation of an upload process, the content classifier 306 examines the content, and generates a flag if a content score (e.g., adult content score, copyright score, etc.) exceeds a predetermined threshold. For example, the content classifier may examine the content for metadata or an embedded legend that indicates a Motion Picture Association of America (MPAA) rating above a certain rating. The flag information 114 indicates the content 104 is potentially inappropriate.

The analyzer component 110 examines the flag information 114, and generates a confidence score regarding the potential accuracy of the flag information 114. The analyzer component 110 in FIG. 3 includes a classifier component 302 that facilitates generation of the confidence score. The classifier component 302 determines or infers the potential accuracy of the flag information via a trained classifier. For example, the classifier component 302 can employ a naïve Bayes classifier, a Hidden Markov Model (HMM), a support vector machine (SVM), a Bayesian network, a decision tree, a neural network, a fuzzy logic model, a probabilistic classifier, and so forth. The classifier is trained using a set of training data. For example, the set of training data can include flag information previously generated by the user 106, viewership data regarding the content 104, and other flag information received by the hosting service 102 for the content 104.

The categorization component 112 categorizes the flag information 114 based in part on the confidence score generated by the analyzer component 110. In FIG. 3, the categorization component 112 includes a utility component 304 that facilitates the categorization of the flag information 114. The utility component 304 compares, analyzes, or otherwise weighs a cost of inaccurately categorizing the flag information 114 received for the content 104, against a benefit of accurately categorizing the flag information 114 received for the content 104. For example, when the content 104 potentially violates the law, the utility component 304 determines that a cost of inaccurately categorizing the flag information 114 as not requiring urgent administrative action is above a predetermined cost threshold (e.g., cost is high), and a benefit of accurately categorizing the flag information 114 as requiring urgent administrative action is above a predetermined benefit threshold (e.g., benefit is high). The categorization component 112 can determine the categorization of the flag information 114 based in part on the cost/benefit determination of the utility component 304. For instance, the categorization component 112 may adjust, modify, or weigh the confidence score determined by the analyzer component 110 based on the cost/benefit determination of the utility component 304.

Figure 4:
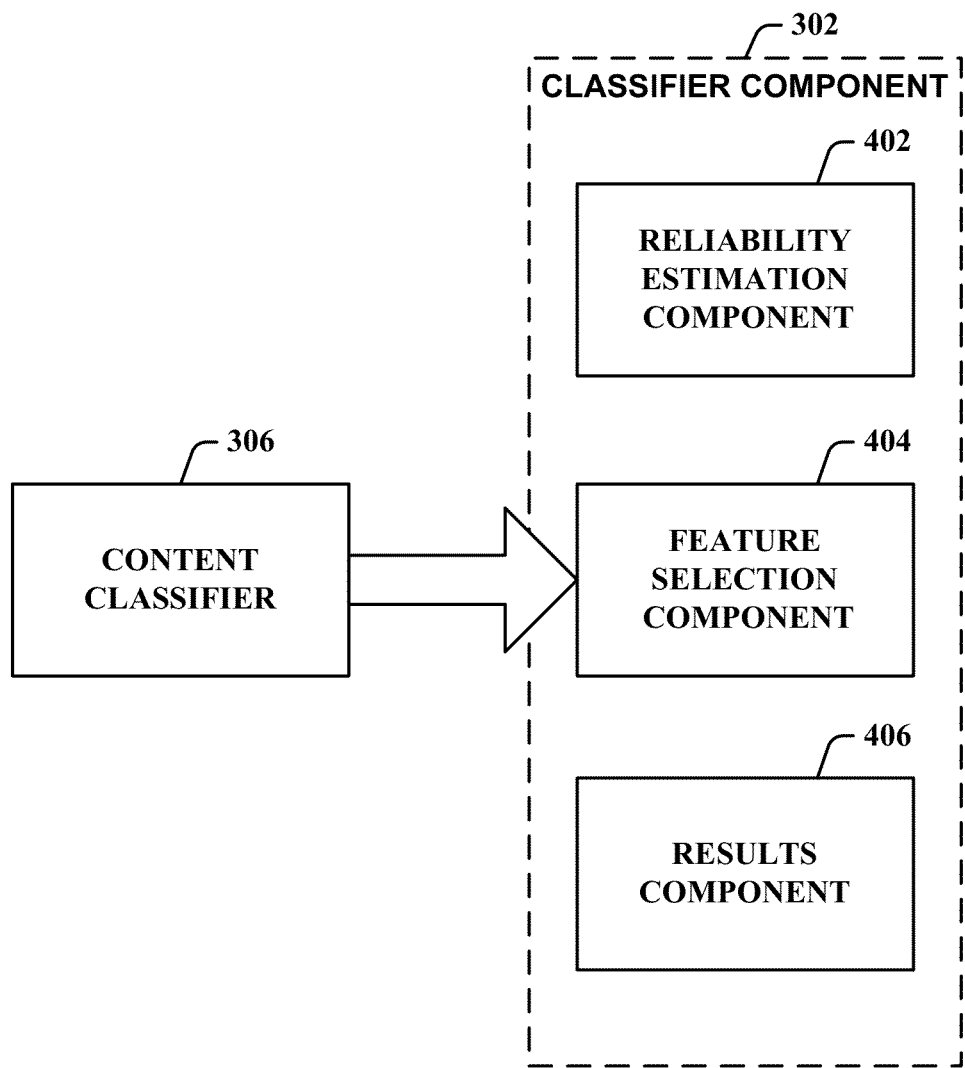
FIG. 4 illustrates an example classifier component in accordance with various aspects described in this disclosure.

Referring to FIG. 4, illustrated is an example classifier component 302 in accordance with various aspects described in this disclosure. As discussed, the classifier component 302 determines or infers the potential accuracy of the flag information 114 using a set of training data. The classifier component 302 in FIG. 4 includes a reliability estimation component 402, a feature selection component 404, and a results component 406. The reliability estimation component 402 determines or infers a probability that the flag information (flag) 114 received from the user 106 is accurate, reliable, or otherwise correct. In one example embodiment, the reliability estimation component 402 determines a probability of the user 106 generating a correct flag by determining a number of correct flags previously generated by the user 106 across all categories (e.g., spam, adult content, copyrighted material, etc.) compared to a total number of flags previously generated by the user 106 (e.g., a percentage of correct flags). If the percentage of correct flags previously generated by the user 106 is greater than a predetermined threshold, such as fifty percent, then the reliability estimation component 402 determines that the next flag generated by the user 106 will be likely correct.

Additionally or alternatively, the classifier component 302 can employ a naïve Bayes classifier, a Hidden Markov Model (HMM), a support vector machine (SVM), a Bayesian network, a decision tree, a neural network, a fuzzy logic model, a probabilistic classifier, and so forth. In an additional example embodiment, the reliability estimation component 402 employs a naïve Bayes classifier learned from a set of training data to determine or infer the probability that the flag information 114 received from the user 106 is accurate. The naïve Bayes classifier employs the following formulation:

$$\hat{y} = \frac{\text{argmax} p(y)}{y \in \mathcal{Y}} \prod_{c \in C} p(x_c, N_c \mid y) \quad \text{(Equation 1)}$$

where, y is a set of possible classifications {correct, incorrect}, $\hat{y}$ is a predicted classification, and C is a set of categories (e.g., spam, adult content, copyrighted material, etc.). $x_c$ and $N_c$ are a number of correct and a number of total flags, respectively, in category c for the user being evaluated. The reliability estimation component 402 uses the resulting classification of correct or incorrect as a prediction for performance evaluation.

As an additional example embodiment, each user can have an associated estimate of a probability of making a correct flag in each category, which is notated as $\theta_c$ for the category c. The reliability estimation component 402 generates the estimate for the category of a newly received flag by constructing a fully-connected graph with a node for each category in which the user has previously generated a flag, as well as a category of the flag 114 (e.g., query category) if not already included. A value of the node for category c is the estimate of $\theta_c$ quantized to L uniformly-spaced levels between 0 and 1.

Each node has a prior cost $f_c(i)$ for assuming the discrete value i based on the user's previous history of generating flags for the associated category. To formulate the cost, the reliability estimation component 402 models $x_c$ as a binomial random variable depending on $\theta_c$ and $N_c$:

$$p(x_c \mid \theta_c; N_c) = \binom{N_c}{x_c} \theta_c^{x_c} (1-\theta_c)^{N_c - x_c} \quad \text{(Equation 2)}$$

Employing Bayes' rule and a uniform prior distribution for $\theta_c$ gives a posterior distribution for $\theta_c$ given the evidence from the history of user 106:

$$p(\theta_c \mid x_c; N_c) = \frac{(N_c + 1)!}{x_c!(N_c - x_c)!} \theta_c^{x_c} (1-\theta_c)^{N_c - x_c} \quad \text{(Equation 3)}$$

The cost for the node taking value i is then the negative log of the integral of the distribution over $w_i$, the area of the $i^{th}$ bin:

$$f_c(j) = -\ln\left(\int_{w_i} p(\theta_c \mid x_c; N_c) d\theta_c\right) \quad \text{(Equation 4)}$$

This distribution enables estimation of a first moment and a second moment of $\theta_c$:

$$\hat{\theta}_c = \int_0^1 \theta_c p(\theta_c \mid x_c; N_c) d\theta_c = \frac{x_c + 1}{N_c + 2} \quad \text{(Equation 5)}$$

$$\hat{\theta}_c^2 = \int_0^1 \theta_c^2 p(\theta_c \mid x_c; N_c) d\theta_c = \frac{(x_c + 1)(x_c + 2)}{(N_c + 2)(N_c + 3)} \quad \text{(Equation 6)}$$

where, each pair of nodes a and b also has a joint cost $g_{a,b}(i,j)$ that describes the likelihood of $\theta_a$ and $\theta_b$ falling into bins i and j simultaneously. These are based on global population statistics, and are the same for all users. The relationship between $\theta_a$ and $\theta_b$ is modeled as bivariate normal. Estimates of the population mean and variance for the examples for category a are:

$$\hat{\mu}_a = E[E[\theta_a]] \approx \frac{1}{N_{a,b}} \sum_k \hat{\theta}_{a,k} \quad \text{(Equation 7)}$$

$$\hat{\sigma}_a^2 = E[E[(\theta_a - \mu_a)^2]] \approx \frac{1}{N_{a,b}} \sum_k \hat{\theta}_{a,k}^2 - (\hat{\theta}_{a,k})^2 \quad \text{(Equation 8)}$$

The reliability estimation component 402 employs a central limit theorem to approximate a set of population moments from an average of the individual moments. The population parameters for category b can be similar. To finish specifying the bivariate normal distribution, the reliability estimation component 402 estimates a correlation between categories a and b as:

$$\rho_{a,b} = \frac{\sum_k (\hat{\theta}_{a,k} - \hat{\mu}_a)(\hat{\theta}_{b,k} - \hat{\mu}_b)}{\hat{\sigma}_a \hat{\sigma}_b} \quad \text{(Equation 9)}$$

With the joint distribution $p(\theta_a, \theta_b)$ described, the joint cost takes the form:

$$g_{a,b}(i,j) = -\ln\left(\int_{w_{a,i}} \int_{w_{b,j}} p(\theta_b \mid \theta_a) d\theta_b d\theta_a\right) \quad \text{(Equation 10)}$$

Again, $w_{a,i}$ and $w_{b,j}$ represent the areas covered by the respective bins. The message passed from node a to node b in iteration t of the belief propagation is an L-vector whose $j^{th}$ element has the form:

$$m_{a \to b, t}(j) = {}^{min}_i f_a(i) + g_{a,b}(i,j) + \Sigma_{c \in R_a \backslash b} m_{c \to a, t-1}(i) \quad \text{(Equation 11)}$$

Discrete indexes i and j run over $\{0 \ldots L-1\}$ and $R_a \backslash b$ represents a set of neighbors of the node for category a, excluding the node for category b. The message passing continues until convergence. The probability of the user 106 making a correct flag for the query category c is taken as the lowest cost option of the node for c at convergence. If it exceeds a predetermined threshold (e.g., 0.5), then the reliability estimation component 402 predicts the query flag is correct.

The feature selection component 404 chooses, determines, or otherwise selects any of a variety of features to be employed in connection with training. The set of training data available for use by the classifier component 302 can be large, and the feature selection component 404 facilitates creating a succinct classifier while maintaining performance. In an example embodiment, the feature selection component 404 locates a set of M feature functions such that a resulting set of M feature statistics produces a prediction of the potential accuracy of a flag. The potential accuracy can be indicated by a binary output label for the content 104 (e.g., a 1 if the content 104 requires high priority administrative action, or a 0 if the content does not require high priority administrative action). For training, the output statistics from a feature function are arranged into a vector u and the output labels form a vector d, each with as many entries as training examples. The feature selection component 404 selects the features iteratively with a conditional mutual information criteria. Examining the set of feasible feature statistic vectors u, the feature selection component 404 determines a best choice in an iteration t based on:

$$u_t^* = {}^{max\ min}_{u \in U_{t' \in \{0 \ldots t-1\}}} I(d; u \mid u_{t'}) \quad \text{(Equation 12)}$$

The best choice in an iteration is determined by the feature that gives the greatest amount of information regarding the accuracy of the output labels, when the feature selection component 404 has prior knowledge of the most similar previously selected feature.

For efficiency, the feature selection component 404 can limit u, for example, to two sources of candidates. For instance, in one implementation, the feature selection component 404 employs genetically selected features that employ genetic algorithms to enable examination of a large quantity of possible features without exhaustively enumerating the features, and auxiliary features that exploit information types that do not correspond with genetic schemes.

In each iteration, the feature selection component 404 evolves several populations of genetic candidates virtually in parallel, and evaluates the genetic candidates according to the mutual information criteria in Equation 12. The feature selection component 404 can examine the auxiliary functions nearly simultaneously. When the evaluations are complete, the feature selection component 404 selects the feature from either source that most closely matches a set of predetermined selection criteria. The feature selection component 404 can repeat the process until a quantity of features satisfying the set of predetermined selection criteria meets, or exceeds, a predetermined feature quantity threshold.

The genetic features can consider time series information relating to historical viewership data of the content 104, additional user flags received regarding the content, or administrative actions previously taken for the content 104 at a predetermined granularity (e.g., one day, etc.), and so forth. The genetic features can be represented in the form of queries, which serve as the chromosomes for evolution. The queries are answered using a data structure called a history space. The feature selection component 404 determines a chromosome's fitness in iteration t by evaluating a query for a set of training examples to generate the feature statistic vector u, then determining the inner term of the conditional mutual information criteria described in Equation 12 with a constant scale factor:

$$\text{fitness}(u, t) = \frac{1}{H(d)} \min_{t' \in \{0...t-1\}} I(d : u \mid u_{t'}) \quad \text{(Equation 13)}$$

The feature selection component 404 divides by the entropy of d to ensure the value of the fitness falls between 0 and 1. The action of the genetic algorithm performs the outer maximization demonstrated in Equation 12.

In one implementation, the feature selection component 404 executes the genetic algorithm with a small population size of 20-30 chromosomes. In each generation, chromosomes randomly choose a mate. The choice can be made with or without regard to performance. The feature selection component 404 applies selective pressure through inter-generational elitism, and a disruptive crossover operation. The disruptive crossover operation is accomplished by randomly exchanging operations and bound limits between the parent chromosomes, producing two candidate children. If the limits are exchanged such that the lower bound exceeds the upper bound, then the bounds are reversed.

The feature selection component 404 ensures diversity of possible bound options by subjecting the chromosomes to possible random mutations, which can include, but are not limited to, changing the operation, opening a bound via setting the lower bound to 0 or the upper bound to cc, or generating a new bound number. The feature selection component 404 discards the worst-performing chromosomes to maintain a fixed population size. In addition, feature selection component 404 promotes diversity by employing an incest prevention threshold, wherein if a chromosome selects a mate that is too similar to itself (e.g., above the incest prevention threshold), then the chromosomes will not produce offspring. If a cycle does not produce any offspring fit for inclusion in a next generation, then the threshold is loosened, reduced, or otherwise relaxed, and the evolution continues. When the incest prevention threshold reaches a predetermined minimum value, the population undergoes a cataclysmic mutation that maintains a set of discovered chromosomes that satisfy a predetermined fitness criteria. The incest prevention threshold is reset, and the evolution is run again until the incest prevention threshold reaches the predetermined minimum value again, at which point the feature selection component 404 returns the best solution discovered. The best solution is determined based on a set of predetermined selection criteria. In an exemplary implementation, the feature selection component 404 executes the genetic algorithm across a set of computers operating in isolation.

The feature selection component 404 also selects auxiliary features from a set of auxiliary features that exploit information types that do not correspond with genetic schemes. For example, the set of auxiliary features can include a scalar output of a content classifier 306, a mean reliability feature, a total reliability feature, or a video length feature. The content classifier 306 scores content based on its substance, subject matter, data, and so forth. For example, the content classifier 306 may assign an adult content score to a video based on the substance of the video. The content classifier 306 can be included in the classifier component 302, or can be a stand-alone component as illustrated.

The mean reliability feature averages reliability estimation results determined by the reliability estimation component 402 for each flag received for the content 104, e.g., for the life of the content 104 or since a most recent administrative action. The total reliability feature determines a sum of the results determined by the reliability estimation component 402 for each flag received for the content 104, e.g., for the life of the content 104 or since a most recent administrative action. It is be appreciated that the foregoing represents but a few examples for brevity and simplicity of explanation, and the set of auxiliary features can include a variety of features that use various information types.

The results component 406 generates, provides, or otherwise produces a human-understandable decision based on the contributions of each feature selected for training by the feature selection component 404. For example, the results component 406 can employ a piecewise linear approximate intersection kernel classifier in combination with a passive aggressive algorithm for weight refinement to provide the human-understandable decision. The piecewise linear approximate intersection kernel classifier learns a function for each feature, mapping a score of the flag 114 for that feature to a contribution in a set of contributions. If the sum of the set of contributions exceeds a tuneable threshold, the content 104 is marked for administrative action. The mapping functions intuitively (e.g., human-understandably) describe how each feature affects the final outcome.

Figure 5:
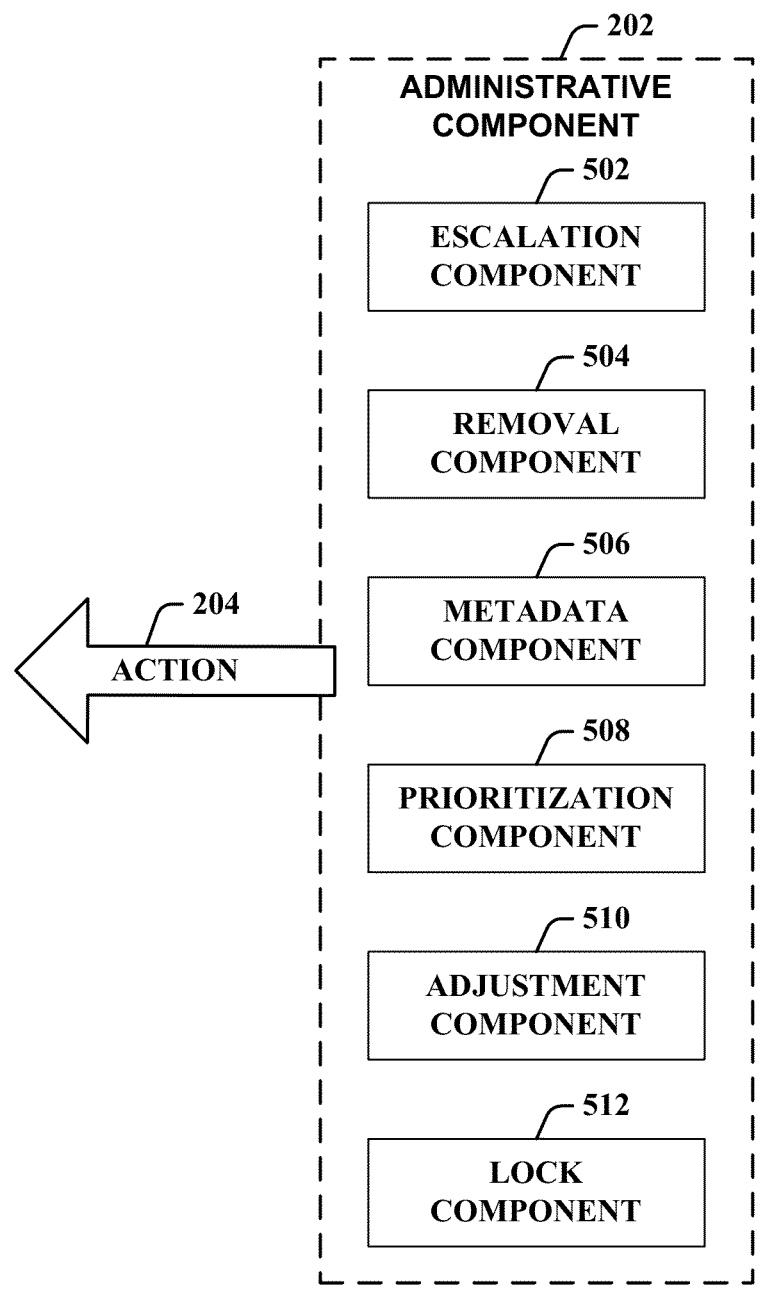
FIG. 5 illustrates is an example administrative component in accordance with various aspects described in this disclosure.

Turning now to FIG. 5, illustrated is an example administrative component 202 that takes one or more actions 204 regarding the potentially inappropriate content 104 based in part on the categorization of the flag information 114 by the categorization component 112. The administrative component 202 in FIG. 5 includes an escalation component 502, a removal component 504, a metadata component 506, a prioritization component 508, an adjustment component 510, and a lock component 512.

The escalation component 502 increases, bumps up, or otherwise escalates the flag information 114 for administrative action. For example, the escalation component 502 may escalate the content 104 from being potentially inappropriate content to content that requires urgent review. Upon escalation, the content 104 can be reviewed by a human reviewer, or by a classifier, such as content classifier 306. The removal component 504 unpublishes, deletes, or otherwise removes the content 104 based at least in part on the categorization. For example, if flag information 114 received for the content 104 is categorized as requiring immediate administrative action by the categorization component, then the removal component 504 can make the content 104 generally unavailable to users or unavailable to a certain subset of users (e.g., based on geography) depending on the categorization.

The metadata component 506 appends, adds, or otherwise attaches metadata to the content 104 based at least in part on the categorization. For example, if it is determined that the content 104 contains graphic material that is inappropriate for children, but is not in violation of a Terms of Use for the Hosting Service 102, then the metadata component 506 attaches metadata to the content 104 that identifies the content as "adult material." The prioritization component 508 places the content 104 near the front of a queue, or top of a stack, containing content for administrative action, such as review, based at least in part on the categorization. For example, in one implementation, if the flag information 114 received for the content 104 is categorized as requiring priority administrative action, and the flag information 114 or a reason for generating the flag information 114 indicates that the content 104 is a violation of a law, then the prioritization component 508 places the content 104 ahead of content in the queue of content flagged for potential Terms of Use violations.

The adjustment component 510 increments, decrements, or otherwise adjusts a reputation of a user for generating accurate or inaccurate flag information based at least in part on the categorization. For instance, if the flag information 114 received from a user is categorized as inaccurate or having a significant potential of being inaccurate, then the adjustment component 510 decrements the user's reputation for generating accurate flag information. The lock component 512 can suspend, terminate, limit or otherwise lock the ability of a user to generate flag information or upload content, e.g., for a certain period of time. For example, if a user's reputation for generating accurate flag information is below a predetermined threshold, then the lock component 512 can suspend the ability of the user to generate flag information. Additionally or alternatively, if a quantity of flags received for content generated by a user exceeds a predetermined threshold, then the lock component 512 can terminate the ability of the user to upload UGC on the hosting service 102.

Non-Limiting Examples of Methods for Screening of Inappropriate Content

Figure 6:
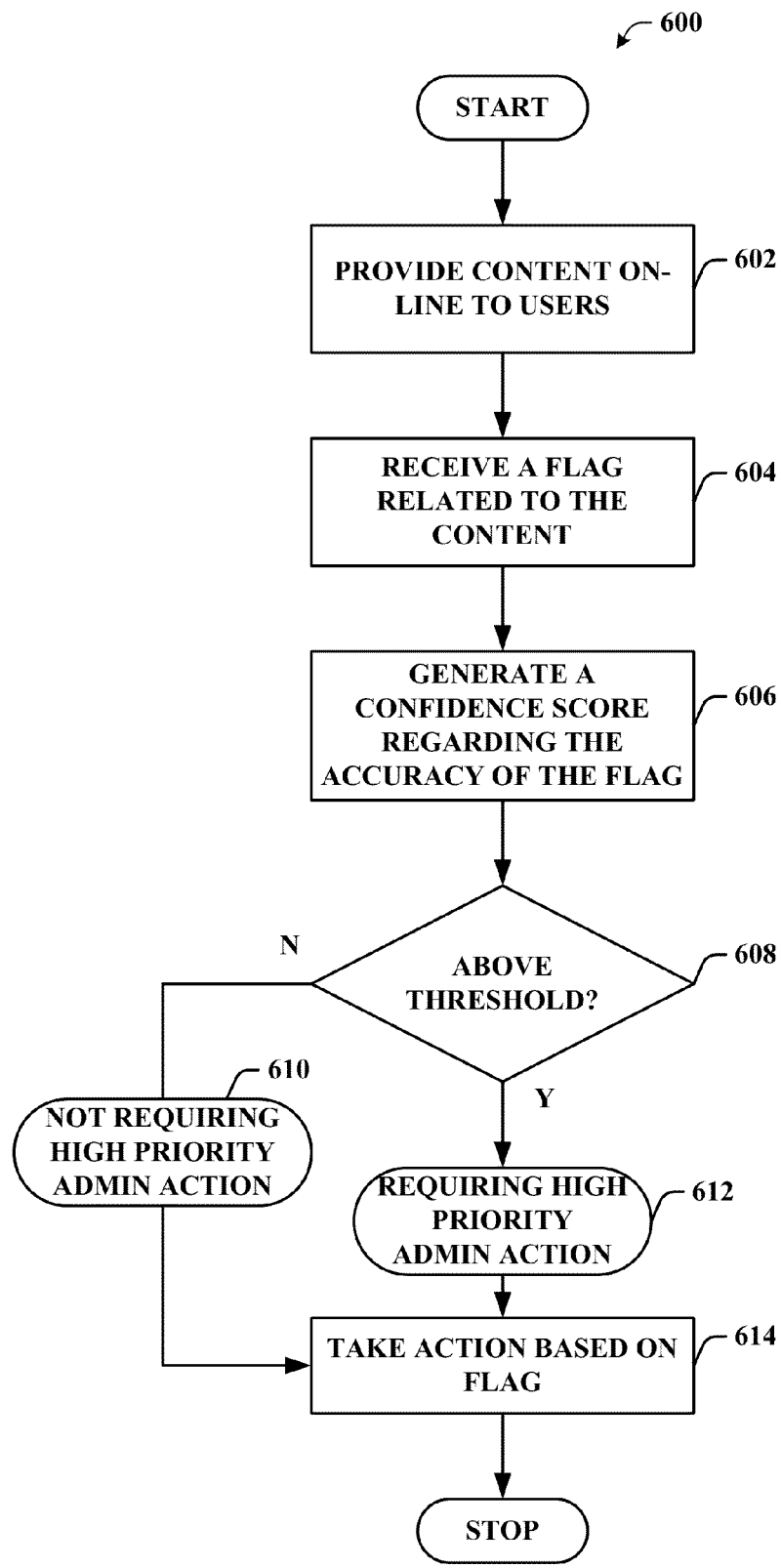
FIGS. 6-8 are example flow diagrams of respective methods for screening potentially inappropriate online content in accordance with various aspects described in this disclosure.
Figure 7:
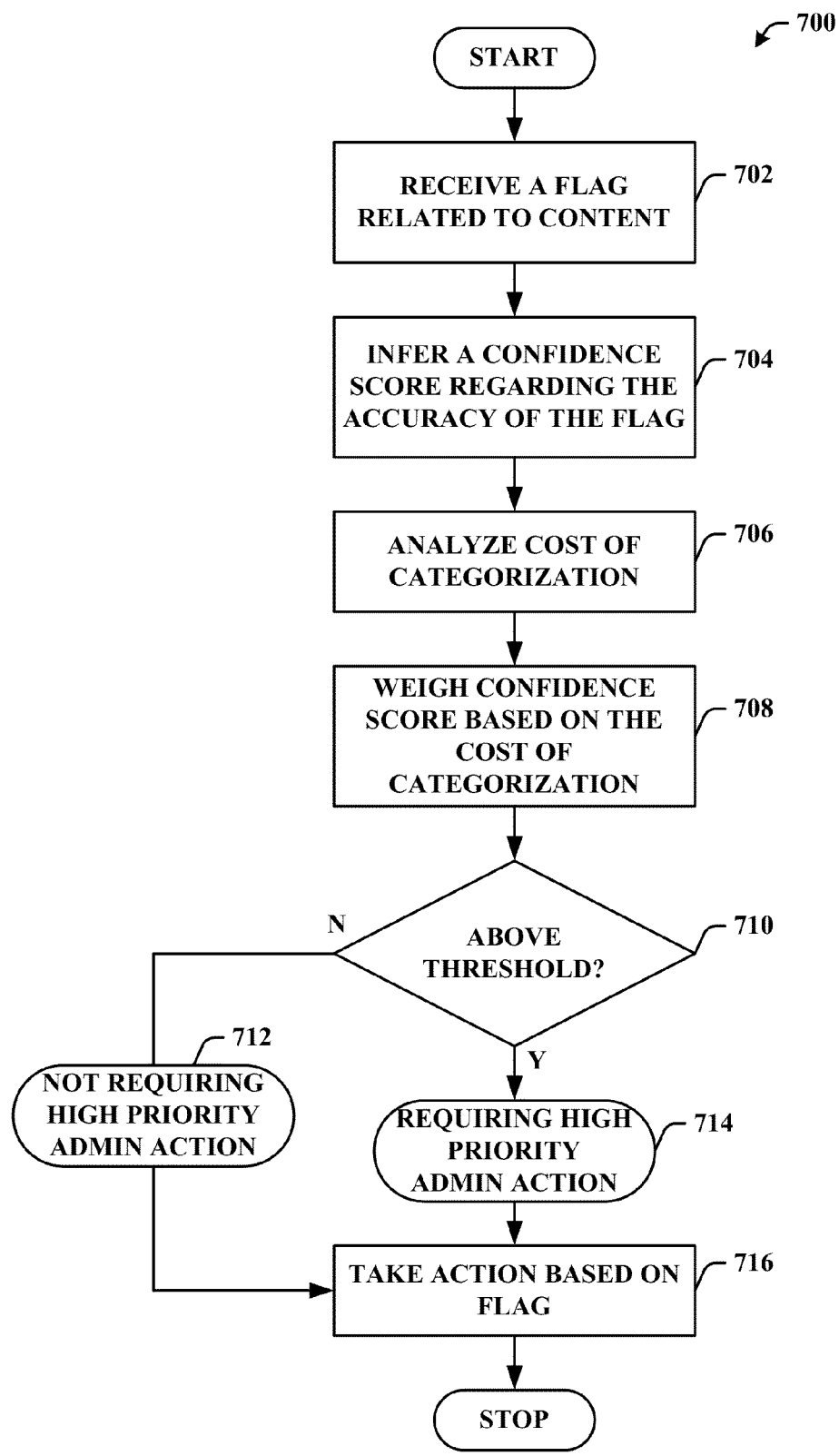
Figure 8:
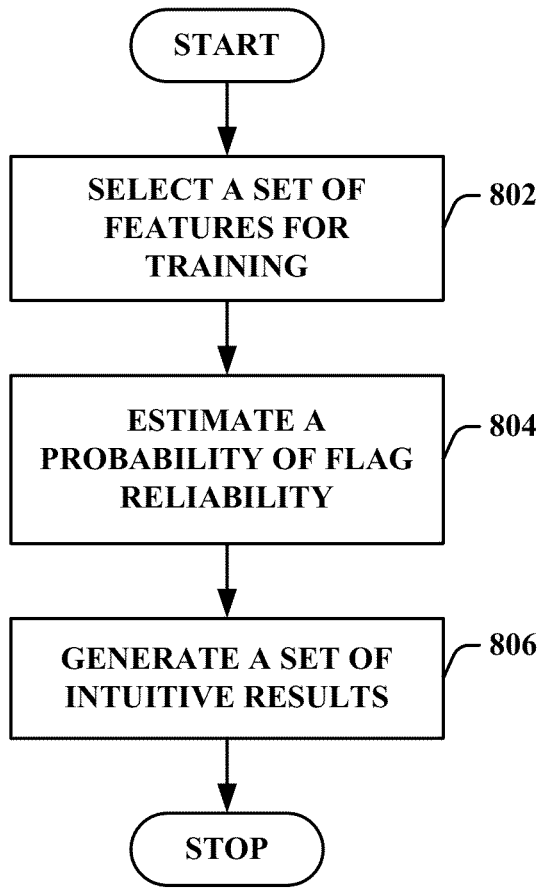

FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described in this disclosure. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for screening potentially inappropriate online content in accordance with various aspects described in this disclosure. At reference numeral 602, content is provided to users on-line (e.g., using the hosting service 102). The content can include, but is not limited to, videos, music, blogs, games, and so forth. The content can be UGC. At reference numeral 604, a flag (e.g., flag information, report, warning, etc.) is received related to the content (e.g., using the reception component 108). The flag indicates that the content contains potentially inappropriate material. For example, the content can be inappropriate if it violates a Term of Use for a hosting service, interferes with an intellectual property right, or violates a law. For example, a user consuming the content may determine that the content is potentially inappropriate for a particular audience, and generate a flag for the content.

At reference numeral 606, a confidence score regarding the potential accuracy of the flag is generated (e.g., using the analyzer component 110). The confidence score is based on a plurality of factors, including but not limited to, a reputation of the flagging user for generating reliable flag information, other flag information received for the content, viewership data for the content, and so forth. For example, the confidence score can be generated based at least in part on a user's reputation for generating reliable flags, wherein the user's reputation is based on a previous number of flags generated by the user determined to be accurate.

At reference numeral 608, a determination is made whether the confidence score is above a predetermined threshold (e.g., using the categorization component 112). If the confidence score is not above the predetermined threshold (N at reference numeral 608), then at reference numeral 610 the flag is classified as not requiring high priority administrative action (e.g., potentially inaccurate), and the methodology advances to reference numeral 614. Returning to reference numeral 608, if the confidence score is above the predetermined threshold (Y at reference numeral 608), then at reference numeral 612 the flag is classified as requiring high priority administrative action (e.g., potentially accurate), and the methodology advances to reference numeral 614.

At reference numeral 614, one or more actions is taken based on the categorization of the flag information at reference numeral 610 or 612 (e.g., using the administrative component 202), including but not limited to escalating the content for review (e.g., using the escalation component 502), unpublishing the content (e.g., using the removal component 504), appending metadata to the content (e.g., using the metadata component 506), prioritizing the content in a pool of content for action (e.g., using the prioritization component 508), adjusting a user's reputation for generating accurate flags (e.g., using the adjustment component 510), or locking one or more user privileges for the flagging user or a user providing the content (e.g., using the lock component 512).

FIG. 7 illustrates an example methodology 700 for screening potentially inappropriate online content in accordance with various aspects described in this disclosure. At reference numeral 702, a flag related to content is received (e.g., using the reception component 108). The flag indicates that the content contains potentially inappropriate material. The flag is received from a source, such as a user that has consumed the content, or from a classifier that determines, scores, or otherwise examines the substance or material included in the content. For instance, the content can be UGC that is uploaded to a hosting service for distribution. A predetermined time after initiation of an upload process, the classifier (e.g., content classifier 306) may examine the content, and generate a flag if a content score (e.g., adult content score, unauthorized copyright reproduction score, etc.) exceeds a predetermined threshold.

At reference numeral 704, a confidence score regarding the potential accuracy of the flag is inferred (e.g., using the classifier component 302). The confidence score is inferred by a trained classifier. For example, the trained classifier can be a naïve Bayes classifier, a Hidden Markov Model (HMM), a support vector machine (SVM), a Bayesian network, a decision tree, a neural network, a fuzzy logic model, a probabilistic classifier, and so forth. The classifier is trained using a set of training data. The set of training data can include, for example, flag information previously generated by the source, viewership data regarding the content, other flag information received for the content 104, and administrative action previously taken regarding the content 104.

At reference numeral 706, a cost of generating an inaccurate categorization, in comparison to a benefit of generating an accurate categorization is analyzed (e.g., cost/benefit analysis) (e.g., using the utility component 304). For instance, when the content potentially violates the law, it is determined or inferred that a cost of incorrectly categorizing a flag as not requiring high priority administrative action (e.g., potentially inaccurate) is above a predetermined cost threshold (e.g., a cost is high), and a benefit of correctly categorizing a flag as requiring high priority administrative action (e.g., potentially accurate) is above a predetermined benefit threshold (e.g., a benefit is high).

At reference numeral 708, the confidence score is adjusted, modified, or otherwise weighted based on the cost/benefit analysis at reference numeral 706 (e.g., using the categorization component 112). For example, if the cost of inaccurately categorizing the content is high, then the confidence score is increased (e.g., multiplied or summed) by a predetermined amount. Additionally or alternatively, if the cost of inaccurately categorizing the content is low, then the confidence score can remain unchanged.

At reference numeral 710, a determination is made whether the confidence score is above a predetermined confidence threshold (e.g., using the categorization component 112). If the confidence score is not above the predetermined confidence threshold (N at reference numeral 710), then at reference numeral 712 the flag is classified as not requiring high priority administrative action, and the methodology advances to reference numeral 716. Returning to reference numeral 710, if the confidence score is above the predetermined threshold (Y at reference numeral 710), then at reference numeral 714 the flag is classified as requiring high priority administrative action, and the methodology advances to reference numeral 716.

At reference numeral 716, one or more actions is taken based on the categorization of the flag information at reference numeral 712 or 714 (e.g., using the administrative component 202), including but not limited to escalating the content for review (e.g., using the escalation component 502), unpublishing the content (e.g., using the removal component 504), appending metadata to the content (e.g., using the metadata component 506), prioritizing the content in a pool of content for action (e.g., using the prioritization component 508), adjusting a user's reputation for generating accurate flags (e.g., using the adjustment component 510), or locking one or more user privileges for the user generating the flag or a user providing the content (e.g., using the lock component 512).

Turning to FIG. 8, illustrated is an example methodology 800 for inferring a confidence score for a received flag in accordance with various aspects described in this disclosure. At reference numeral 802, a set of features are selected for training (e.g., training features) a trained classifier employed at reference numeral 804 to infer the estimation of flag reliability (e.g., using the feature selection component 404). The quantity of training data available for use by the classifier can be relatively large, wherein employing all the training data would be inefficient. The set of features selected for training are the features that return the best results, wherein the best results are determined by the features satisfying a set of predetermined criteria, including, but not limited to, diversity, completeness, accuracy, or consistency with prior results. In addition, the features selected can include genetically selected features that consider time series information associated with at least one of a set of viewership data of the content, a set of additional flag information received regarding the potentially inappropriate content, or a set of administrative actions taken regarding the potentially inappropriate content. In addition, the features selected can include auxiliary features that use information types that do not correspond with genetic schemes.

At reference numeral 804, an estimate of a probability of a source (e.g., user or classifier) generating an accurate flag is determined or inferred using the trained classifier (e.g., using the reliability estimation component 402). For example, the estimation of the probability can be determined based on the percentage of correct flags previously generated by the source across a category (e.g., spam, adult content, copyrighted material, all categories, etc.), compared to a total number of flags previously generated by the source for the category. Additionally or alternatively, the trained classifier can be a naïve Bayes classifier, a Hidden Markov Model (HMM), a support vector machine (SVM), a Bayesian network, a decision tree, a neural network, a fuzzy logic model, a probabilistic classifier, and so forth, that infers the confidence score of the received flag as a function of the training features.

At reference numeral 806, a set of intuitive results (e.g., human-understandable) are generated based on the contributions of each feature selected for training (e.g., using the results component 406). For example, a piecewise linear approximate intersection kernel classifier in combination with a passive aggressive algorithm for weight refinement can be employed to provide the intuitive results. The piecewise linear approximate intersection kernel classifier can learn a function for each feature, mapping a score of the content for that feature to a contribution in a set of contributions. If the sum of the set of contributions exceeds a tuneable threshold, the content is marked for administrative action. The mapping functions intuitively (e.g., human-understandably) describes how each feature affects the final outcome.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of this disclosure.

Figure 9:
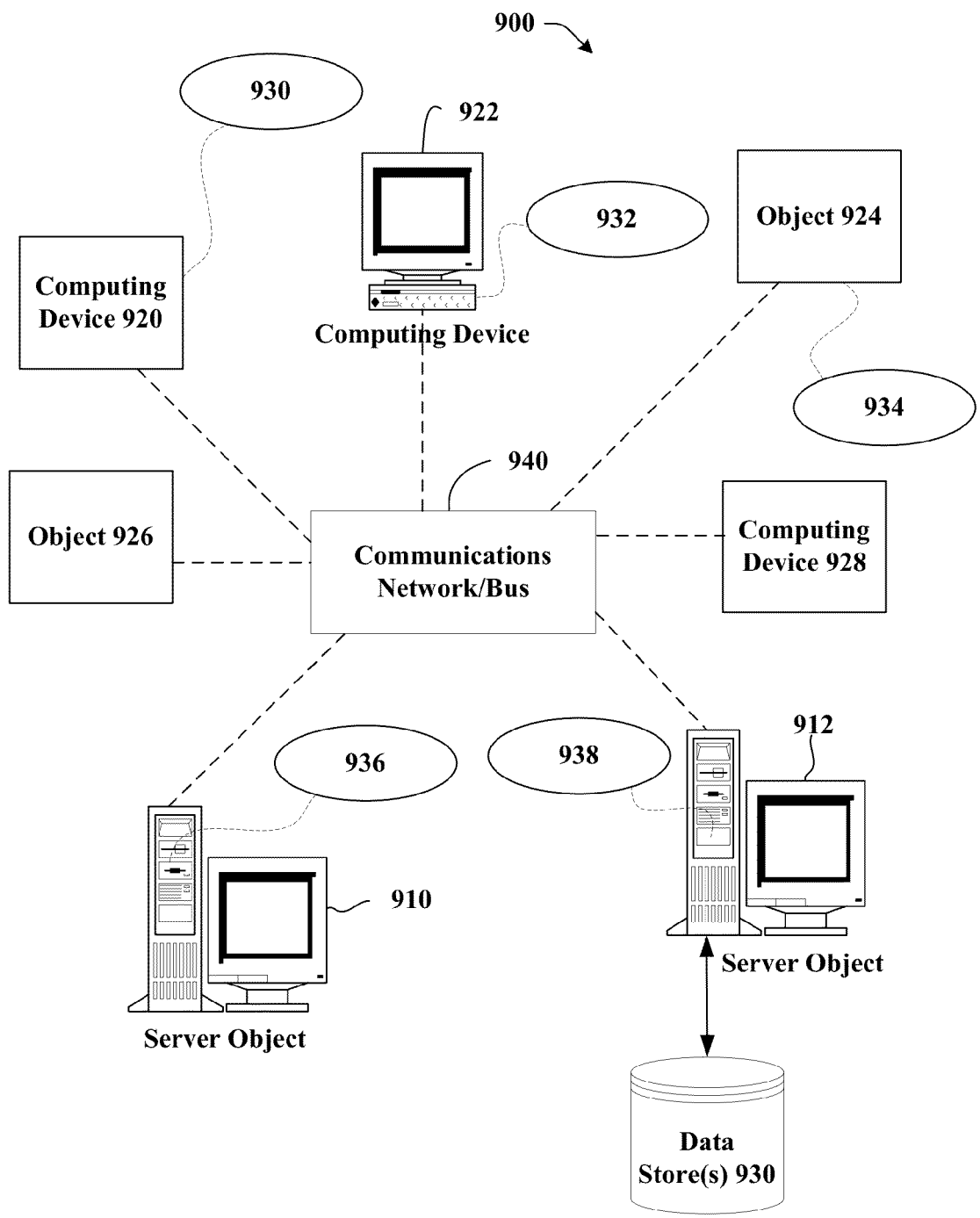
FIG. 9 is a block diagram representing an exemplary non-limiting networked environment in which various embodiments can be implemented.

FIG. 9 provides a schematic diagram of an exemplary networked or distributed computing environment. The distributed computing environment includes computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may include different devices, such as personal data assistants (PDAs), audio/video devices, mobile phones, MP3 players, personal computers, tablets, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may include other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of the smooth streaming provided in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described in this disclosure can be applied to any device suitable for implementing various embodiments described in this disclosure. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described in this disclosure. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
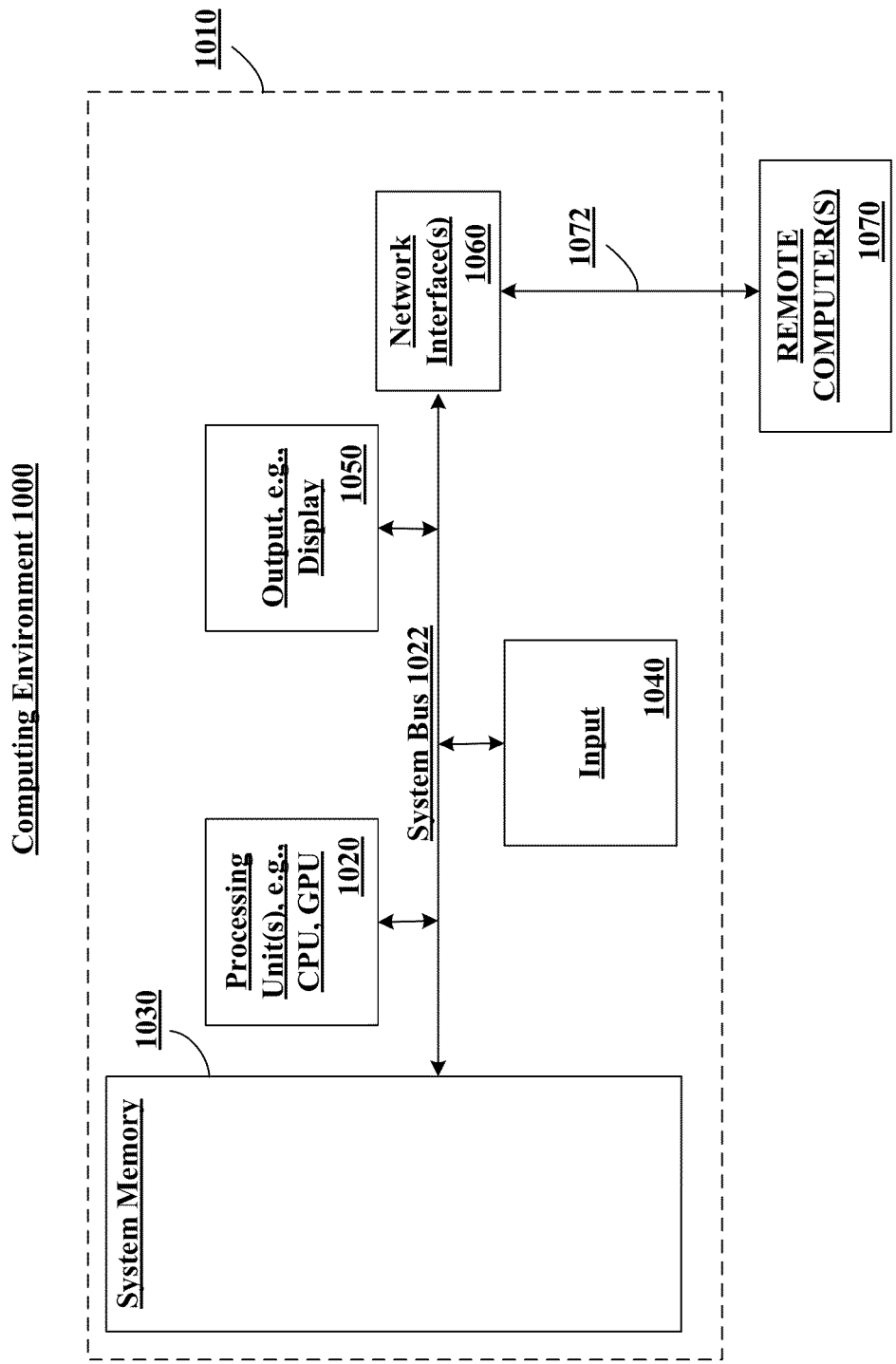
FIG. 10 is a block diagram representing an exemplary non-limiting computing system or operating environment in which various embodiments can be implemented.

FIG. 10 thus illustrates an example of a suitable computing system environment 1000 in which one or aspects of the embodiments described in this disclosure can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used in this disclosure to mean serving as an example, instance, or illustration. For the avoidance of doubt, this matter disclosed in this disclosure is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described in this disclosure may be implemented in connection with hardware or software or, where appropriate, with a combination of both. As used in this disclosure, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described in this disclosure may also interact with one or more other components not specifically described in this disclosure but generally known by those of skill in the art.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory storing computer executable components; and
a processor configured to execute the following computer executable components stored in the memory:
  a reception component configured to receive flag information indicating content available via a content hosting site as potentially inappropriate;
  an analyzer component configured to generate a confidence score regarding accuracy of the flag information, wherein the analyzer component is further configured to generate the confidence score based at least in part upon respective determined accuracies of a source of the flag information for categories associated with the content, the respective determined accuracies determined by:
    construction of a fully connected graph for each category in which the source has generated flag information, wherein respective nodes are associated with each category;
    determination of a cost for each node of the graph based upon respective histories of flag information for the associated category for the source;
    determination of respective first and second moments for each cost;
    determination of respective joint costs for each pair of nodes based at least in part upon the respective first and second moments; and
    determination of respective probabilities of accuracy of the source of the flag information for each category based upon the respective joint costs;
  a categorization component configured to categorize the flag information as a function of the confidence score.

2. The system of claim 1, further comprising an administrative component configured to take action based at least in part on the categorization of the flag information.

3. The system of claim 1, wherein the categorization component is configured to determine that the confidence score is above a predetermined threshold, and in response to the confidence score being above the predetermined threshold, categorize the flag information as requiring priority administrative action.

4. The system of claim 1, further comprising a classifier component configured to employ a trained classifier to facilitate generating the confidence score.

5. The system of claim 4, wherein the trained classifier is a naïve Bayes classifier.

6. The system of claim 4, wherein the classifier is trained with a set of genetically selected features that depend on time series information associated with at least one of a set of viewership data of the content, a set of additional flag information received regarding the potentially inappropriate content, or a set of administrative actions taken regarding the potentially inappropriate content.

7. The system of claim 1, wherein the historical information is an accuracy value of prior flag information generated by the source.

8. A method, comprising:
   receiving, by a system including a processor, a flag that identifies content available via a content hosting site as inappropriate;
   generating, by the system, a confidence score regarding accuracy of the flag, wherein the generating comprises generating the confidence score based at least in part on respective determined accuracies of a source of the flag for categories associated with the content, where the respective determined accuracies are determined by:
      constructing a fully connected graph for each category in which the source has generated at least one flag, wherein respective nodes are associated with each category;
      determining a cost for each node of the graph based upon respective histories of the at least one flag for the associated category for the source;
      determining respective first and second moments for each cost;
      determining respective joint costs for each pair of nodes based at least in part upon the respective first and second moments; and
      determining respective probabilities of accuracy of the source of the flag for each category based upon the respective joint costs; and
   categorizing, by the system, the flag based at least in part on the confidence score.

9. The method of claim 8, wherein the categorizing includes categorizing the flag information as requiring priority administrative action if the confidence score is above a predetermined confidence threshold.

10. The method of claim 8, further comprising, based on the categorizing of the flag, adjusting, by the system, a stored reputation of the source for generating accurate flags.

11. The method of claim 8, further comprising, based on the categorizing of the flag, locking, by the system, a user privilege for the source.

12. The method of claim 8, further comprising training, by the system, a classifier, wherein generating the confidence score is based at least in part on a set of results from the classifier.

13. The method of claim 12, wherein training the classifier includes genetically selecting a set of features that depend on time series data associated with at least one of a set of viewership data of the content, a set of additional flags received regarding the content, or a set of administrative actions taken regarding the content.

14. A non-transitory computer-readable medium having instructions stored thereon that, in response to execution, cause a system including a processor to perform operations comprising:
   receiving, from a client device associated with a consuming source, a flag indicating user-generated content uploaded to a content hosting site is inappropriate;
   generating a confidence score regarding an accuracy of the flag, wherein the generating comprises generating the confidence score based at least in part on respective determined accuracies of the consuming source associated with the flag for categories associated with the content, where the respective determined accuracies are determined by:
      constructing a fully connected graph for each category in which the consuming source has generated at least one flag, wherein respective nodes are associated with each category;
      determining a cost for each node of the graph based upon respective histories of the at least one flag for the associated category for the consuming source;
      determining respective first and second moments for each cost;
      determining respective joint costs for each pair of nodes based at least in part upon the respective first and second moments; and
      determining respective probabilities of accuracy of the source of the flag for each category based upon the respective joint costs; and
   categorizing the flag based at least in part on the confidence score.

* * * * *